(12) United States Patent
Hillen et al.

(10) Patent No.: US 10,820,520 B2
(45) Date of Patent: Nov. 3, 2020

(54) CLEANING SYSTEM FOR A COMBINE HARVESTER INCLUDING ELECTROMAGNETICALLY DRIVEN SIEVES

(71) Applicant: CNH Industrial America LLC, New Holland, PA (US)

(72) Inventors: Curtis Frederick Hillen, Lititz, PA (US); Daniel Thomas Turner, Villa Park, IL (US)

(73) Assignee: CNH Industrial America LLC, New Holland, PA (US)

( * ) Notice: Subject to any disclaimer, the term of this patent is extended or adjusted under 35 U.S.C. 154(b) by 209 days.

(21) Appl. No.: 15/985,945

(22) Filed: May 22, 2018

(65) Prior Publication Data

US 2019/0357441 A1 Nov. 28, 2019

(51) Int. Cl.
*A01F 12/44* (2006.01)
*A01F 12/32* (2006.01)
*A01F 12/56* (2006.01)

(52) U.S. Cl.
CPC ............ *A01F 12/448* (2013.01); *A01F 12/32* (2013.01); *A01F 12/56* (2013.01)

(58) Field of Classification Search
CPC ...... A01F 12/448; A01F 12/446; A01F 12/44; A01F 12/56; A01F 12/32; A01D 75/282; A01D 41/1276
See application file for complete search history.

(56) References Cited

U.S. PATENT DOCUMENTS

| | | | | |
|---|---|---|---|---|
| 5,527,219 A | * | 6/1996 | Schumacher | A01F 12/446 460/101 |
| 7,927,199 B2 | * | 4/2011 | Adamson | A01D 75/282 460/101 |
| 9,258,945 B2 | * | 2/2016 | Pearson | A01F 12/446 |
| 9,622,415 B2 | | 4/2017 | Duquesne et al. | |

(Continued)

FOREIGN PATENT DOCUMENTS

| EP | 1712122 A1 | 10/2006 |
|---|---|---|
| EP | 2145530 A2 | 1/2010 |

OTHER PUBLICATIONS

Extended European Search Report for EP Application No. 19175869.7 dated Oct. 29, 2019 (six pages).

*Primary Examiner* — Arpad Fabian-Kovacs
(74) *Attorney, Agent, or Firm* — Peter Zacharias; Patrick Sheldrake

(57) ABSTRACT

A cleaning system for a combine harvester includes a sieve for capturing grain, and a magnetic propulsion system configured to move the sieve in a reciprocating motion with respect to a stationary housing of the combine harvester. The magnetic propulsion system includes a magnet that moves as the sieve moves and a plurality of electromagnets arranged along a path of movement of the magnet during a throw stroke and a return stroke of the sieve. During the throw stroke, the plurality of electromagnets may be one of attracted to and repulsed by the magnet. During the return stroke, the plurality of electromagnets may be another of attracted to and repulsed by the magnet. The magnet may move along an arc, and the plurality of magnet may be arranged along an arc adjacent to the magnet.

23 Claims, 9 Drawing Sheets

(56) References Cited

U.S. PATENT DOCUMENTS

| | | | |
|---|---|---|---|
| 2002/0195377 A1* | 12/2002 | Trench | B07B 1/284 |
| | | | 209/365.1 |
| 2003/0186731 A1* | 10/2003 | Voss | A01F 12/448 |
| | | | 460/101 |
| 2006/0229119 A1* | 10/2006 | Wamhof | A01D 75/282 |
| | | | 460/101 |
| 2015/0296712 A1 | 10/2015 | Duquesne et al. | |
| 2016/0029562 A1 | 2/2016 | De Smet et al. | |
| 2018/0229607 A1* | 8/2018 | Schoeny | B60L 1/20 |

\* cited by examiner

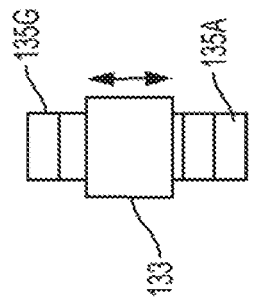
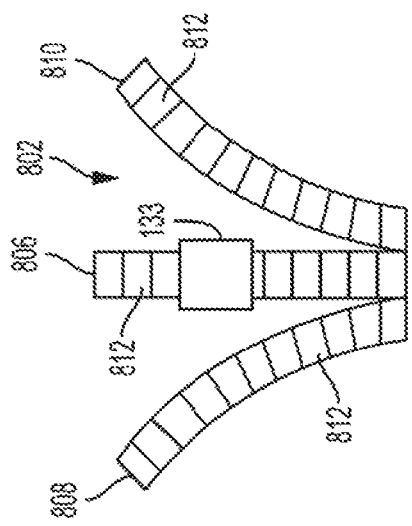
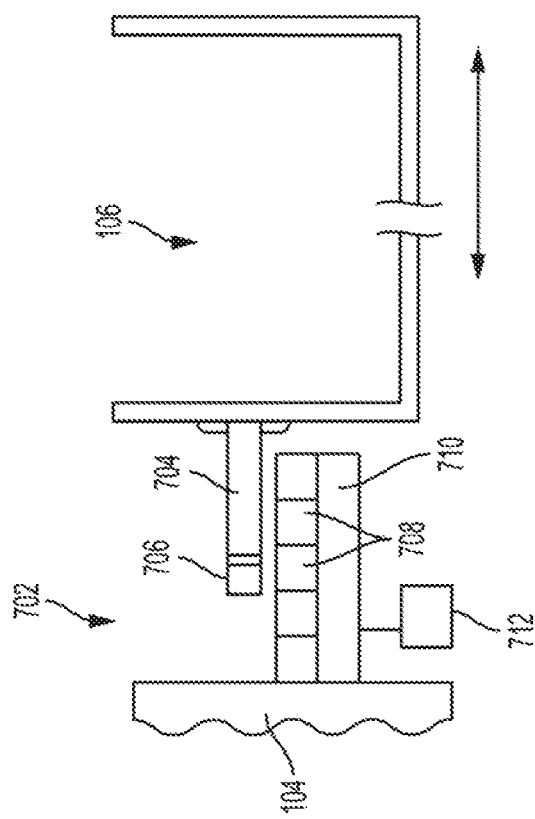

CLEANING SYSTEM FOR A COMBINE HARVESTER INCLUDING ELECTROMAGNETICALLY DRIVEN SIEVES

FIELD OF THE INVENTION

The invention relates to a cleaning system of a combine harvester. The cleaning system may be operated by magnetic force.

BACKGROUND OF THE INVENTION

A combine harvester has a cleaning system for separating harvested seeds from by-products that are harvested along with said seeds.

Combine harvesters are widely used in the harvesting of various types of grain, corn and other crops of which the seed is harvested. Typically, a combine harvester cuts the plants that contain the seeds to be harvested from the field. The harvested crop is threshed inside the combine harvester, in which process the seeds are separated from the other parts of the plants. The stalks of the harvested plants are removed from the combine harvester and a mixture of harvested seeds and by-products remains in the combine harvester. These by-products (e.g. chaff) are generally smaller than the stalks that are removed from the combine harvester.

The mixture of harvested seeds and by-products is transported to a cleaning system, in which the threshed seeds are separated from the by-products. The cleaning system generally comprises one or more sieves, which perform a reciprocating movement during use. The sieved seeds are then collected and transported to the grain tank of the combine harvester, which is generally emptied periodically.

The sieve or sieves of the cleaning system are generally arranged at an angle relative to the horizontal, with the front end of the sieve lower than the rear end of the sieve. The reciprocating movement of the sieve causes the seeds and by-products to be thrown upwards and backwards by the sieve.

It is known to arrange the sieves on rocker arms and to drive the sieves simultaneously in a reciprocation motion via an eccentric device in combination with a pitman arm. The eccentric device may comprise a crank or an eccentric disc that is driven by an input drive.

The reciprocation sieve movement comprises a throw stroke and a return stroke. During the throw stroke, the sieve throws the harvested seeds and by-products upward from the sieve. During the return stroke, the sieve moves back from the end position of the throw stroke to the beginning position of the throw stroke. The harvested seeds and by-products are airborne during most of the return stroke of the sieve. The fan blows the airborne lighter weight by-products towards the rear of the combine. The harvested seeds and remaining by-products fall back onto sieve during the last part of the decelerating portion of the return stroke.

Relevant examples of cleaning systems are described in U.S. Patent Application Publication Nos. 2016/0029562 and 2015/0296712, each of which is incorporated by reference herein in its entirety for all purposes. The location of a cleaning system in a combine is shown in U.S. Patent Application Publication No. 2015/0296712.

It would be desirable to reduce the number of components of the cleaning system including the input drive, the eccentric device and the pitman arm in the interests of reducing cost and simplifying assembly. It would also be desirable to move the sieves independently in an effort to (i) tailor the shaking motion of the individual sieves for specific crops, as well as (ii) minimize vibration experienced in the station of the combine.

SUMMARY OF THE INVENTION

An embodiment includes a cleaning system for a combine harvester including a sieve for capturing grain, and a magnetic propulsion system configured to move the sieve in a reciprocating motion with respect to a stationary housing of the combine harvester.

An embodiment includes the magnetic propulsion system in combination with a side-shaking control system for moving the sieve in a side to side direction that is orthogonal to the fore to aft and vertical directions.

An embodiment includes magnetic propulsion system in combination with the side-shaking control system. The magnetic propulsion system comprises (i) a magnetic material, and (ii) at least one electromagnet that is capable of either attracting or repelling the magnetic material. The magnetic material is fixedly mounted to one of the sieve and the stationary housing, and the at least one electromagnet is fixed to the other of the stationary housing and the sieve, such that either magnetic attraction or magnetic repulsion causes the sieve to move with respect to the stationary housing.

BRIEF DESCRIPTION OF THE FIGURES

FIG. 7 depicts an alternative side shaking control system, shown schematically, for the partial cleaning system of FIG. 6.

FIG. 8A depicts the magnetic propulsion system, shown schematically, for the cleaning system of FIG. 1 that is capable of moving the sieves in the fore-aft and vertical directions.

FIG. 8B depicts an alternative magnetic propulsion system, shown schematically, for the cleaning system of FIG. 1 that is capable of moving the sieves in the fore-aft, vertical and side to side directions.

DETAILED DESCRIPTION

The terms "grain," "seeds," "straw," and "tailings" may be used principally throughout this specification for convenience but it is to be understood that these terms are not intended to be limiting. Thus "grain" or "seeds" refers to that part of the crop material which is threshed and separated from the discardable part of the crop material, which is referred to as non-grain crop material, material other than grain (MOG) or straw. Incompletely threshed crop material is referred to as "tailings."

Also the terms "forward," "rearward," "left," and "right", when used in connection with the agricultural harvester (e.g. combine) and/or components thereof are usually determined with reference to the direction of forward operative travel of the combine, but again, they should not be construed as limiting. The terms "longitudinal" and "transverse" are determined with reference to the fore-and-aft direction of the agricultural combine and are equally not to be construed as limiting.

Figure 1:
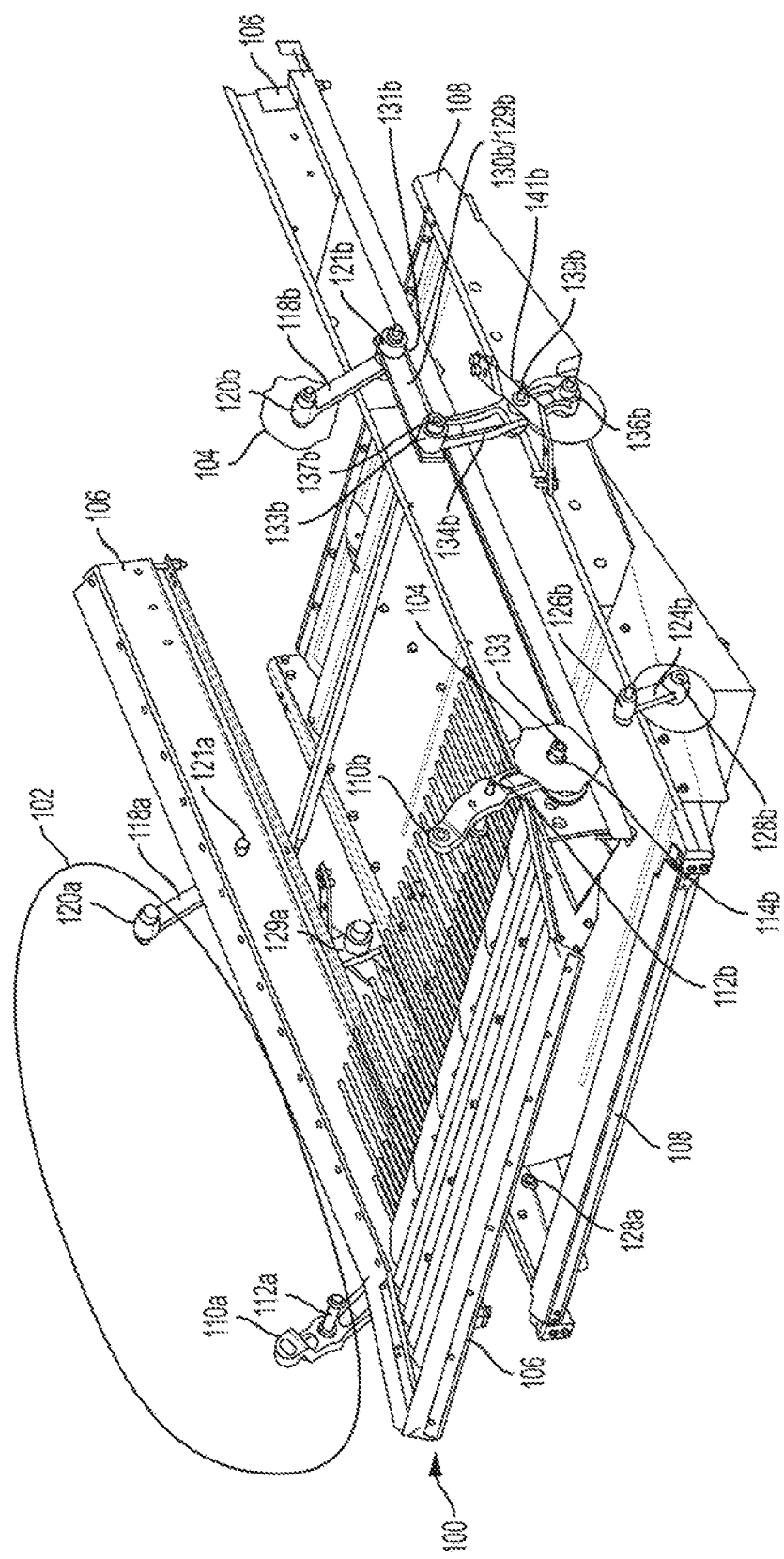
FIG. 1 is an isometric view of a magnetically operated cleaning system for a combine harvester, as viewed from the front and left sides of the system, according to a first exemplary embodiment of the invention.

Referring now to the details of the invention, FIG. 1 depicts an isometric view of a magnetically operated cleaning system 100 (system 100, hereinafter) for a combine harvester, according to a first exemplary embodiment of the invention.

The system 100 is mounted between opposing stationary walls 102 and 104 of the combine. Portions of the walls 102 and 104 are shown in FIG. 1. The walls 102 and 104 may not necessary be flat. Items 102 and 104 may alternatively symbolize fixed mounting points on the combine.

The system 100 includes an upper relatively coarse sieve 106 that is positioned above a lower relatively fine sieve 108. The basic frame structure of the sieves 106 and 108 are shown in FIG. 1 and other figures. Various features of the sieves 106 and 108 are omitted from the drawings in order to permit depiction of other features of the system 100.

One rocker arm 110a is mounted to the forward right-side corner of the sieve 106, and another rocker arm 110b is mounted to the forward left-side corner of the sieve 106. The free ends 111 (FIG. 2) of the rockers arms 110a and 110b may be connected by a bar (not shown). The rocker arms 110a and 110b may be substantially identical. The rocker arm 110a is rotatably mounted to the wall 102 by fastener 112a. Similarly, the rocker arm 110b is rotatably mounted to the wall 104 by fastener 112b. The fasteners 112a and 112b are positioned through holes formed in the central portion of the arms 110a and 110b, respectively. The rocker arms 110a and 110b are capable of pivoting about their fasteners 112a and 112b, respectively. The lower ends of the rocker arms 110a and 110b are fixedly mounted to the right and left sides of the upper sieve 106 by fasteners 114a and 114b, respectively. The lower ends of the rocker arms 110a and 110b may not pivot or move with respect to the upper sieve 106.

A magnet 133 is mounted to the fastener 114b, and the purpose of the magnet 133 will be described with reference to FIGS. 3A-3C. A magnet 133 may also be mounted to the other fastener 114a, in the same manner as fastener 114b.

A hanger arm 118a is mounted to the rearward right-side corner of the sieve 106, and another hanger arm 118b is mounted to the rearward left-side corner of the sieve 106. The hanger arms 118a and 118b may be substantially identical. The hanger arm 118a is rotatably mounted to the wall 102 by fastener 120a. Similarly, the hanger arm 118b is rotatably mounted to the wall 104 by fastener 120b. The fasteners 120a and 120b are positioned through holes formed in the top end of the arms 118a and 118b, respectively. The hanger arms 118a and 118b are capable of pivoting about their fasteners 120a and 120b, respectively. The lower ends of the hanger arms 118a and 118b are fixedly mounted to the right and left sides of the upper sieve 106 by fasteners 121a and 121b, respectively. The arms 118a and 118b are capable of pivoting with respect to the upper sieve 106 and the housing walls 102 and 104.

One hanger arm 124a (not shown) is mounted to the forward right-side corner of the lower sieve 108, and another hanger arm 124b is mounted to the forward left-side corner of the sieve 108. The hanger arms 124a and 124b may be substantially identical. The hanger arm 124a is rotatably mounted to the wall 102 by fastener 126a (not shown). Similarly, the hanger arm 124b is rotatably mounted to the wall 104 by fastener 126b. The fasteners 126a and 126b are positioned through holes formed in the top end of the arms 124a and 124b, respectively. The arms 124a and 124b are capable of pivoting about their fasteners 126a and 126b, respectively. The lower ends of the arms 124a and 124b are mounted to the right and left sides of the lower sieve 108 by fasteners 128a and 128b, respectively. The arms 124a and 124b are capable of pivoting with respect to the lower sieve 108 and the housing walls 102 and 104.

Linkages 129a and 129b transfer motion of the upper sieve 106 to the lower sieve 108. Although only the linkage 129b will be described hereinafter, it should be understood that the linkage 129a is substantially identical.

A first end 131 of a connecting link 130b of the linkage 129b is pivotally connected to the arm 118b and the upper sieve 106 by the fastener 120b. The connecting link 130b can pivot with respect to the upper sieve 106. A second opposing end 133b of the connecting link 130b is pivotally connected to the top end of a rocker arm 134b of the linkage 129b by a fastener 137b. The rocker arm 134b can pivot with respect to the connecting link 130b about the fastener 137b. The center of the rocker arm 134b is pivotally connected to a fastener 139b, such that the rocker arm 134b is configured to rotate about the fastener 139b. The fastener 139b is also connected to a bracket 141b that is connected to the wall 104, such that the rocker arm 134b is directly and pivotably connected to the wall 104. The bottom end of the rocker arm 134b is pivotally connected to the lower sieve 108 by a fastener 136b. The rocker arm 134b can pivot with respect to the lower sieve 108.

A linkage 129a (a portion of which is shown) on the right side of the assembly 100, which comprises a connecting link 130a (not shown) and rocker arm 134a, transfers motion of the upper sieve 106 to the lower sieve 108. Although not shown, the connecting link 130a and rocker arm 134a interconnect the rear right side of the upper sieve 106 to the rear right side of the lower sieve 108 in the same manner as that of the linkage 129b. The linkage 129a works together with the linkage 129b in a simultaneous fashion to transfer motion of the upper sieve 106 to the lower sieve 108 so that the sieves 106 and 108 move together.

Figure 2:
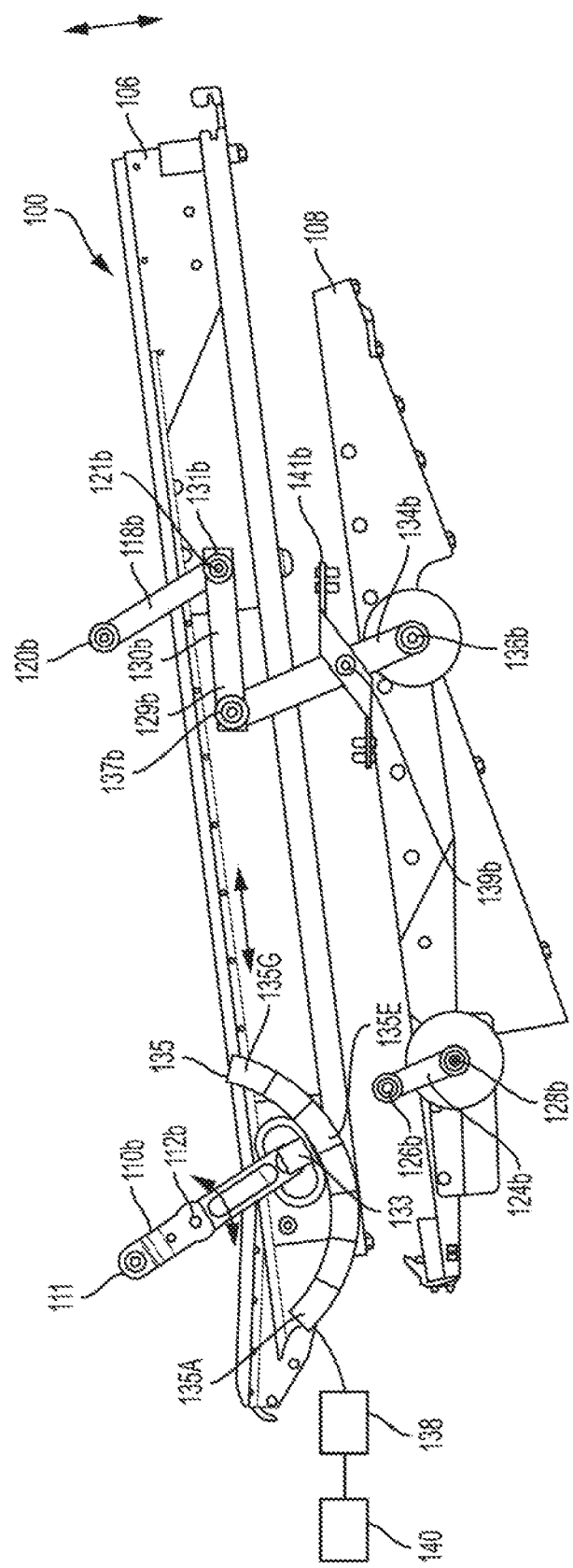
FIG. 2 is a left side elevation view of the cleaning system of FIG. 1 showing additional details of the magnetic system.

FIG. 2 depicts the magnetic propulsion system for moving the cleaning system 100 with respect to the housing 102/104 of the combine. The magnetic propulsion system generally includes a magnet 133 that is configured to interact with a series of electromagnets 135.

The magnet 133 is fixedly mounted to the end of the arm 110b adjacent to the fastener 114b. Alternatively, the magnet 133 may be mounted directly to the fastener 114b. The magnet 133 may be a permanent magnet, an electromagnet, or a material that is capable of being magnetized, such as a ferromagnetic material, by way of example. The magnet 133 may be referred to herein more generally as a magnetic material.

A plurality of electromagnets 135A-135G (either collectively or individually referred to as electromagnet(s) 135) are mounted to the wall 104 of the combine at a stationary location adjacent to the magnet 133. Alternatively, the electromagnets 135 may be mounted to any other point on the combine that is both adjacent to the magnet 133 and stationary relative to the sieves. The electromagnets 135 are arranged side by side along a semi-circular path, as shown. Alternatively, the path of the electromagnets 135 may take any other desired shape. Although the electromagnets 135 are shown encircling the magnet 133, the magnet 133 may be positioned adjacent the outer circumference of the electromagnets 135.

The electromagnets 135 are connected to and controlled by a controller 138 of the combine. The electromagnets 135 may be activated and deactivated on an individual basis by the controller 138. The magnet 133 and the electromagnets 135 work together to move the sieve 108 along a trajectory in a reciprocating fashion. The trajectory is defined at least in part by the path formed by the electromagnets 135 and the pivot point 112a and 112b of the rocker arms 110a and 110b, respectively. The trajectory extends in both the fore-aft directions (see horizontal arrow) as well as the vertical direction (see vertical arrow). According to this embodiment, the sieve 106 moves along with the sieve 108 by virtue of the linkages 129a and 129b.

The magnet 133 and the electromagnets 135 are located on the left side of the system 100. Although not shown, the magnet 133 and the electromagnets 135 may additionally be located on the right side of the system 100. More particularly, the arm 110a may include a second magnet 133 and a second plurality of electromagnets 135 may be mounted to the housing wall 102.

Figure 3A:
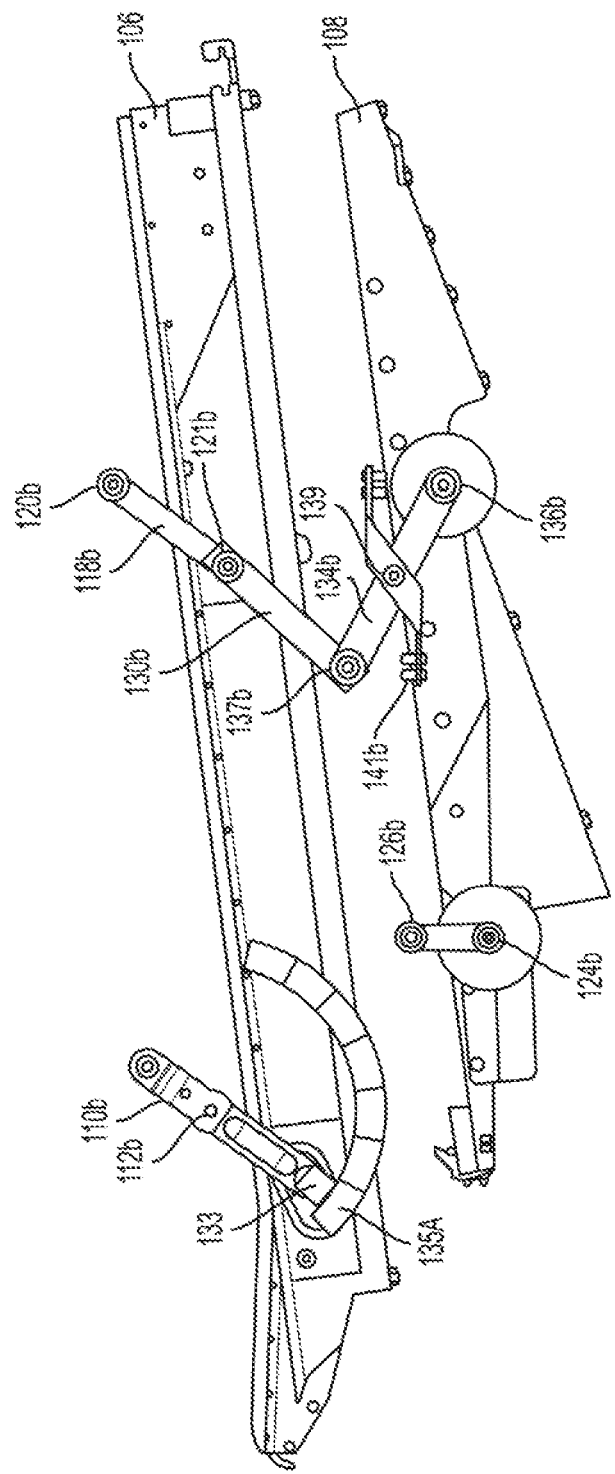
FIGS. 3A-3C depict progressive motion of the cleaning system of FIG. 1.
Figure 3B:
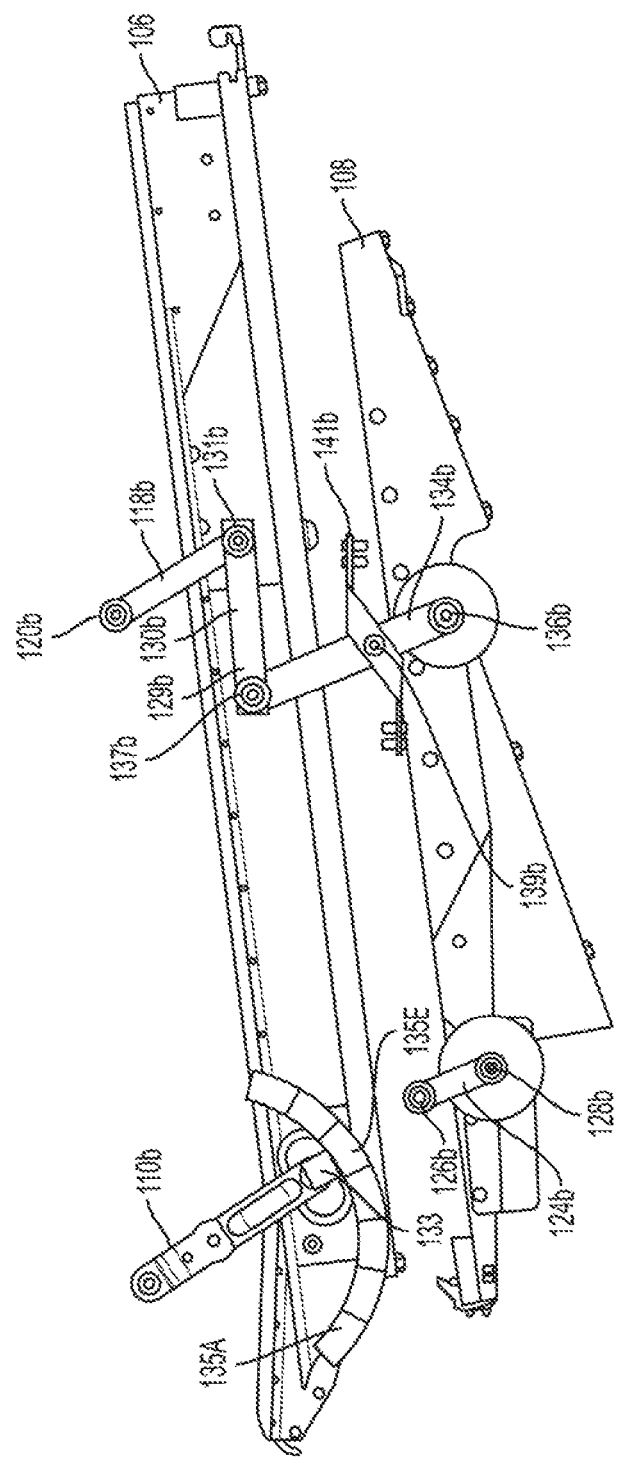
Figure 3C:
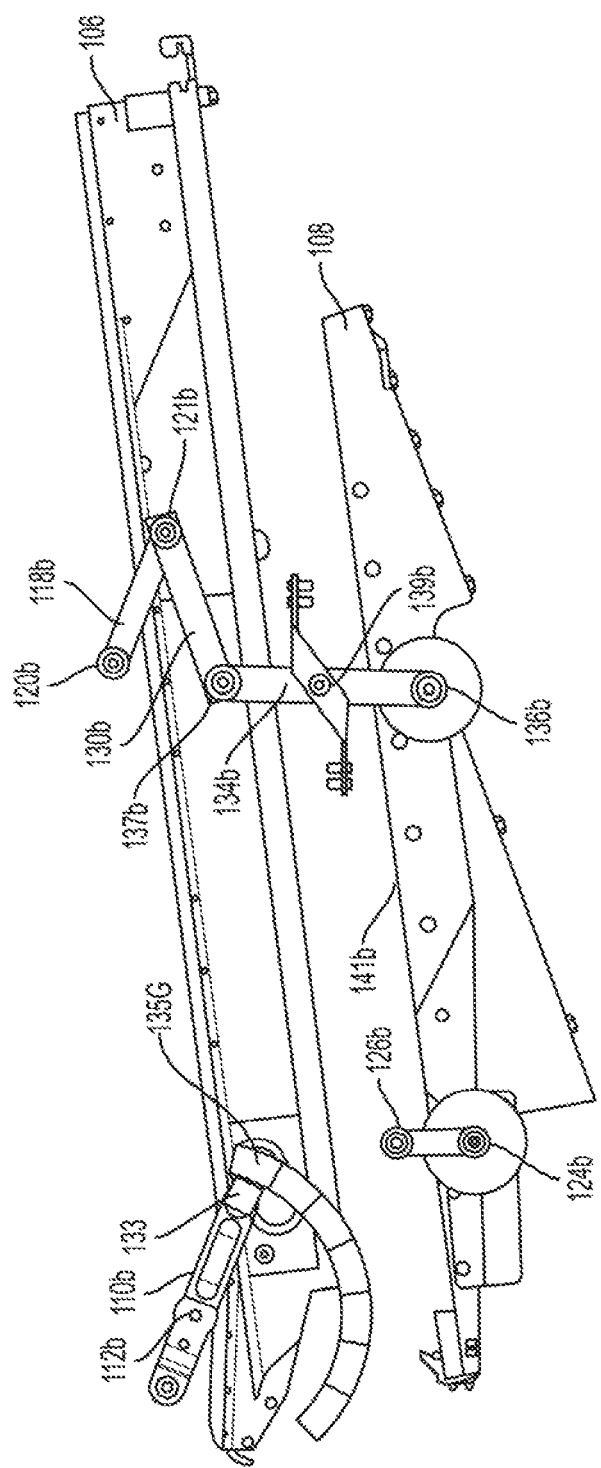

FIGS. 3A-3C depict operation of the cleaning system 100. In the forward position of the system 100 shown in FIG. 3A, the magnet 133 is positioned near the electromagnet 135A (which is activated) while the remaining electromagnets 135 are deactivated. Attraction between the magnet 133 and the electromagnet 135A may hold the entire cleaning system 100 in place. Alternatively, a spring or other device may hold the cleaning system 100 in the forward position.

Starting from the forward position of FIG. 3A, the controller 138 deactivates the electromagnet 135A and activates the electromagnet 135B which causes the magnet 133 and the arm 110b to move toward the electromagnet 135B. The controller 138 then deactivates the electromagnet 135B and activates the electromagnet 135C which causes the magnet 133 and the arm 110b to move toward the electromagnet 135C. The controller 138 then deactivates the electromagnet 135C and activates the electromagnet 135D which causes the magnet 133 and the arm 110b to move toward the electromagnet 135D. This process continues until the magnet 133 reaches the electromagnet 135G. Movement of the magnet 133 from the electromagnet 135A to the electromagnet 135G constitutes the throw stroke of the cleaning system 100. Electromagnet 135A constitutes the beginning of the throw stroke, whereas the electromagnet 135G constitutes the end of the throw stroke. The magnet 133 may be caused to move by either attraction or repulsion to the electromagnets 135.

The sequence of the throw stroke is depicted in FIG. 3A to FIG. 3C. During the throw stroke, as the magnet 133 moves from electromagnet 135A to electromagnet 135G, the upper sieve 106 moves toward the back of the combine harvester (i.e., in a direction opposite to the normal driving direction of the combine harvester) and rotates in a counterclockwise direction (as viewed in those figures) about pivot points 112a and 112b. The lower sieve 108 moves toward the front of the combine harvester and rotates in a clockwise direction about pivot points 126b and 139b by virtue of the linkages 129a and 129b.

Once the sieves 106 and 108 reach the end of the throw stroke, the sieves 106 and 108 are then moved through the return stroke, as will be described hereinafter.

Starting from the rearward position of FIG. 3C, the controller 138 deactivates the electromagnet 135G and activates the electromagnet 135F which causes the magnet 133 and the arm 110b to move toward the electromagnet 135F. The controller 138 then deactivates the electromagnet 135F and activates the electromagnet 135E which causes the magnet 133 and the arm 110b to move toward the electromagnet 135E. The controller 138 then deactivates the electromagnet 135E and activates the electromagnet 135D which causes the magnet 133 and the arm 110b to move toward the electromagnet 135D. This process continues until the magnet 133 returns to the electromagnet 135A. Movement of the magnet 133 from the electromagnet 135G to the electromagnet 135A constitutes the return stroke of the cleaning system 100. Electromagnet 135G constitutes the beginning of the return stroke, whereas electromagnet 135A constitutes the end of the return stroke.

The magnet 133 may be caused to move by either attraction or repulsion to the electromagnets 135, as noted above. According to one example, if the magnet 133 is caused to move by repulsion from the electromagnets 135 in the throw stroke, then the polarity of the electromagnets 135 may be switched for the return stroke to cause the magnet 133 to move by attraction to the activated electromagnets 135 in the return stroke. Alternatively, if the magnet 133 is caused to move by attraction to the electromagnets 135 in the throw stroke, then the polarity of the electromagnets 135 may be switched for the return stroke to cause the magnet 133 to move by repulsion from the activated electromagnets 135 in the return stroke.

The sequence of the return stroke is depicted in FIG. 3C to FIG. 3A. As the magnet 133 moves from electromagnet 135G to electromagnet 135A, the upper sieve 106 moves toward the front of the combine harvester and rotates in a clockwise direction (as viewed in those figures), whereas the lower sieve 108 moves toward the rear of the combine harvester and rotates in a counterclockwise direction.

Referring now to the overall operation of the combine, crop material falls from the threshing system of the combine onto the coarse upper sieve 106. Seeds such as grain or corn pass through the coarse sieve 106 and fall onto the fine lower sieve 108. During the throw stroke for each sieve, the sieve throws the harvested seeds and by-products upward. The sieves 106 and 108 may operate in opposite strokes directions (e.g., when one sieve is moving in the throw stroke, the other sieve is moving in the return stroke). The throw stroke comprises an accelerating portion and a decelerating portion. The accelerating portion is the first half of the throw stroke (from electromagnet 135A to electromagnet 135D) and the decelerating portion is the second half of the throw stroke (from electromagnet 135E to electromagnet 135G). The harvested seeds and by-products generally leave the surface of the sieves at or close to the end of the accelerating portion of the throw stroke.

During the return stroke, the sieve moves back from the end position of the throw stroke to the beginning position of the throw stroke. Generally, the sieve moves towards the front of the combine harvester during the return stroke, in the direction of the normal driving direction of the combine harvester. The harvested seeds and by-products generally are airborne during most of the return stroke of the sieve. The fan blows the airborne lighter weight by-products towards the rear of the combine. The harvested seeds and byproducts fall back onto sieve during the last part of the decelerating portion of the return stroke.

The sieves 106 and 108 separate the seed from the remaining by-products of other material, such as pod fragments and the like. The seed is collected below the sieve 108 where an auger (not shown) is provided that conveys the clean seeds to an elevator (not shown), which in turn conveys the clean seeds upwardly to a grain tank (not shown).

Operation of the electromagnets 135 is controlled by the controller 138. Both the speed and stroke length of the sieves 106 and 108 may be either inputted or selected by a user of the system 100. The controller 138 is capable of adjusting the stroke length of the sieves 106 and 108 by activating a subset of the electromagnets 135 (e.g., electromagnets 135A to 135E) thereby limiting the range of rotation of the magnet 133. The controller 138 is capable of adjusting the reciprocating speed of the sieves 106 and 108 by either changing the speed at which adjacent electromagnets 135 are activated and deactivated and/or changing the electromagnetic force of the electromagnets 135. During the accelerating portion of a stroke, the controller 138 may increase the speed at which adjacent electromagnets 135 are activated and deactivated, and during a decelerating portion of a stroke, the controller 138 may decrease the speed at which adjacent electromagnets 135 are activated and deactivated.

It is to be understood that the above-described operating steps are performed by the controller 138 upon loading and executing software code or instructions which are tangibly stored on a tangible computer readable medium 140, such as on a magnetic medium, e.g., a computer hard drive, an optical medium, e.g., an optical disc, solid-state memory, e.g., flash memory, or other storage media known in the art. Thus, any of the functionality performed by the controller 138 described herein, such as the aforementioned method of operation, is implemented in software code or instructions which are tangibly stored on the tangible computer readable medium 140. Upon loading and executing such software code or instructions by the controller 138, the controller 138 may perform any of the functionality of the controller 138 described herein, including any steps of the aforementioned method described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Figure 4:
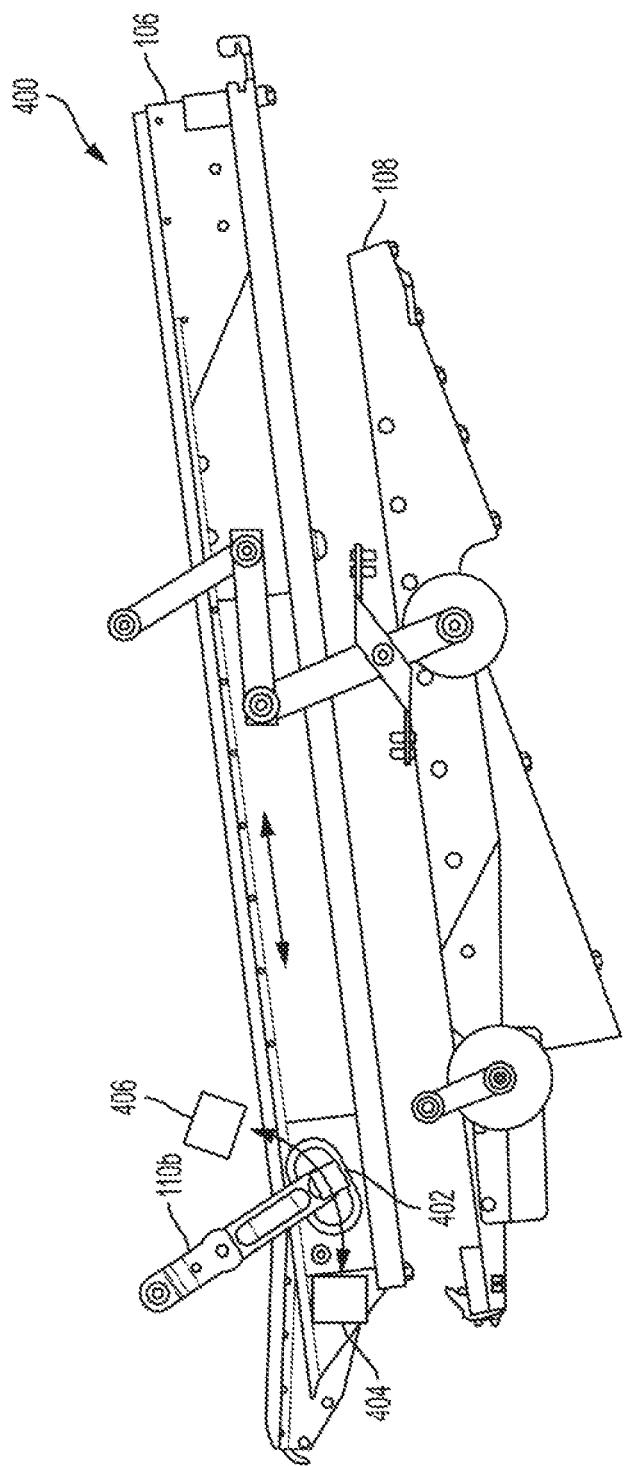
FIG. 4 is a left side elevation view of another magnetically operated cleaning system, like the system of FIGS. 1 and 2, according to a second exemplary embodiment of the invention.

FIG. 4 is a left side elevation view of another magnetically operated cleaning system 400, like the system 100 of FIGS. 1 and 2, according to a second exemplary embodiment of the invention. The system 400 is substantially similar to the system 100 and the primary differences between those systems will be described hereinafter. Unless otherwise mentioned, the features and operation of the system 400 are the same as that of the system 100.

In lieu of a side-by-side stack of electromagnets, the system 400 includes two electromagnets 404 and 406. The electromagnet 404 is positioned at the forward end of the system 400 and the electromagnet 406 is positioned rearwardly of the electromagnet 404. The magnet 402 positioned at the end of the arm 110b is configured to be either repelled or attracted by the electromagnets 404 and 406.

Starting from the forward position of the magnet 402 in which the magnet 402 is positioned against the electromagnet 404, in the course of the throw stroke, the electromagnet 404 is operated to repel the magnet 402 and the electromagnet 406 is operated to attract the magnet 402. This effect causes the magnet 402 to move from the electromagnet 404 to the electromagnet 406 in the course of the throw stroke. Alternatively, the electromagnet 404 may be deactivated while the electromagnet 406 is operated to attract the magnet 402. The sieves 106 and 108 move in the throw stroke as described above with reference to system 100.

Starting from the rearward position of the magnet 402 in which the magnet 402 is positioned against the electromagnet 406, in the course of the return stroke, the electromagnet 406 is operated to repel the magnet 402 and the electromagnet 404 is operated to attract the magnet 402. This effect causes the magnet 402 to move from the electromagnet 406 back to the electromagnet 404 in the course of the return stroke. Alternatively, the electromagnet 406 may be deactivated while the electromagnet 404 is operated to attract the magnet 402. The sieves 106 and 108 move in the return stroke as described above with reference to system 100.

Figure 5:
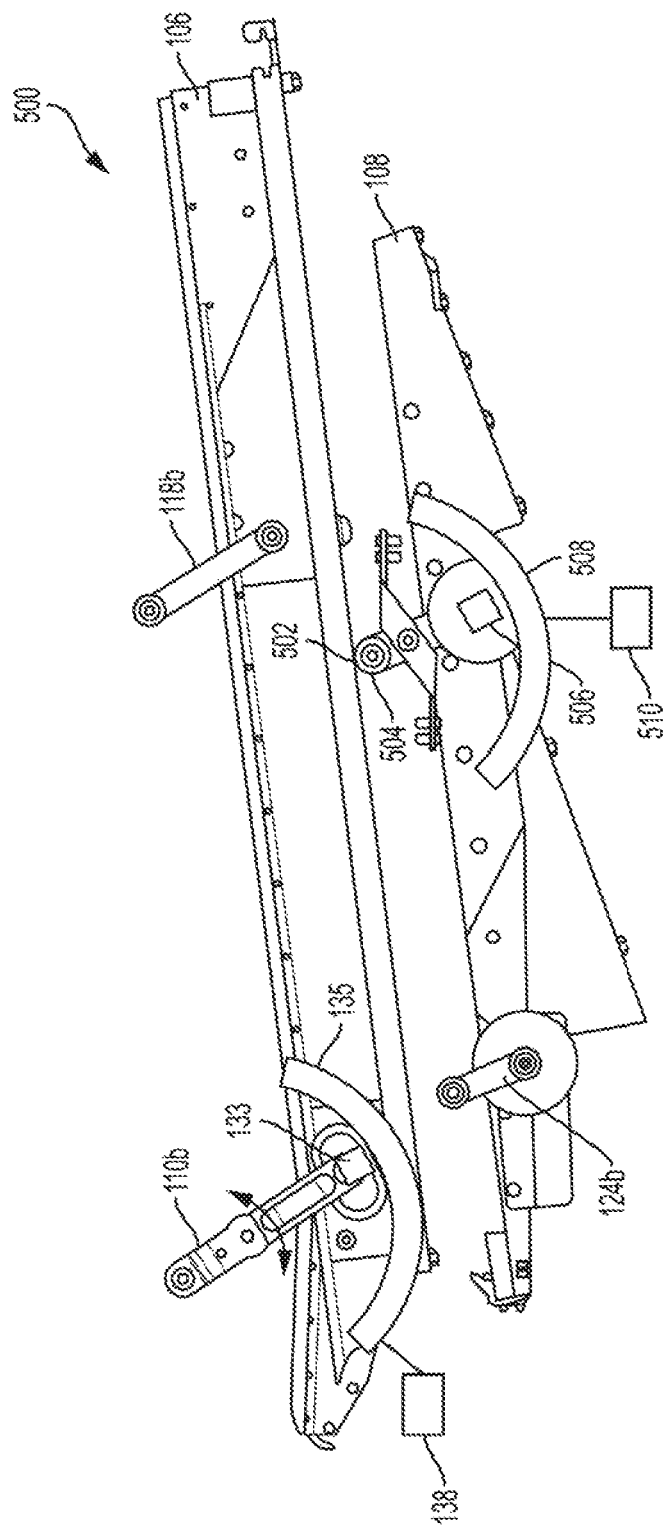
FIG. 5 is a left side elevation view of yet another magnetically operated cleaning system, like the system of FIGS. 1 and 2, according to a third exemplary embodiment of the invention.

FIG. 5 is a left side elevation view of another magnetically operated cleaning system 500, like the system 100 of FIGS. 1 and 2, according to a third exemplary embodiment of the invention. The system 500 is substantially similar to the system 100 and the primary differences between those systems will be described hereinafter. Unless otherwise mentioned, the features and operation of the system 500 are the same as that of the system 100.

Unlike the system 100, the system 500 does not include any linkages 129a and 129b, and a separate magnetic propulsion system is coupled to the lower sieve 108. The upper sieve 106 is powered by the magnet 133 and the electromagnets 135 (like the system 100), however, the lower sieve 108 is powered by a separate and independent magnetic propulsion system.

In lieu of the linkages 129a and 129b, the rearward end of the lower sieve 108 is supported by hanger arms 502 (one shown). Each arm 502 is coupled to a fixed point (or housing wall 102/104) on the combine by a fastener 504. The arms 502 are configured to pivot about their fasteners 504.

The separate magnetic propulsion system comprises a magnet 506 that is coupled the end of the arm 502 that is connected to the sieve 108, and a plurality of electromagnets 508. The electromagnets 508 are also controlled by a controller 510. The controllers 138 and 510 may be combined into a single controller unit, if so desired. Interaction between the magnet 506 and the electromagnets 508 is the same as described with reference to the magnet 133 and the electromagnets 135.

By assigning an independent magnetic propulsion system to each sieve 106 and 108, it is possible to individually control the movement of each sieve 106 and 108. This can be useful for minimizing vibrations that are experienced in the station of the combine. This can also be useful for individually adjusting the reciprocating speed and/or stroke lengths of the sieves 106 and 108 to conform to specific crop processing requirements. For example, sieve 106 can be moved at one speed and sieve 108 can be moved at a different speed.

Figure 6:
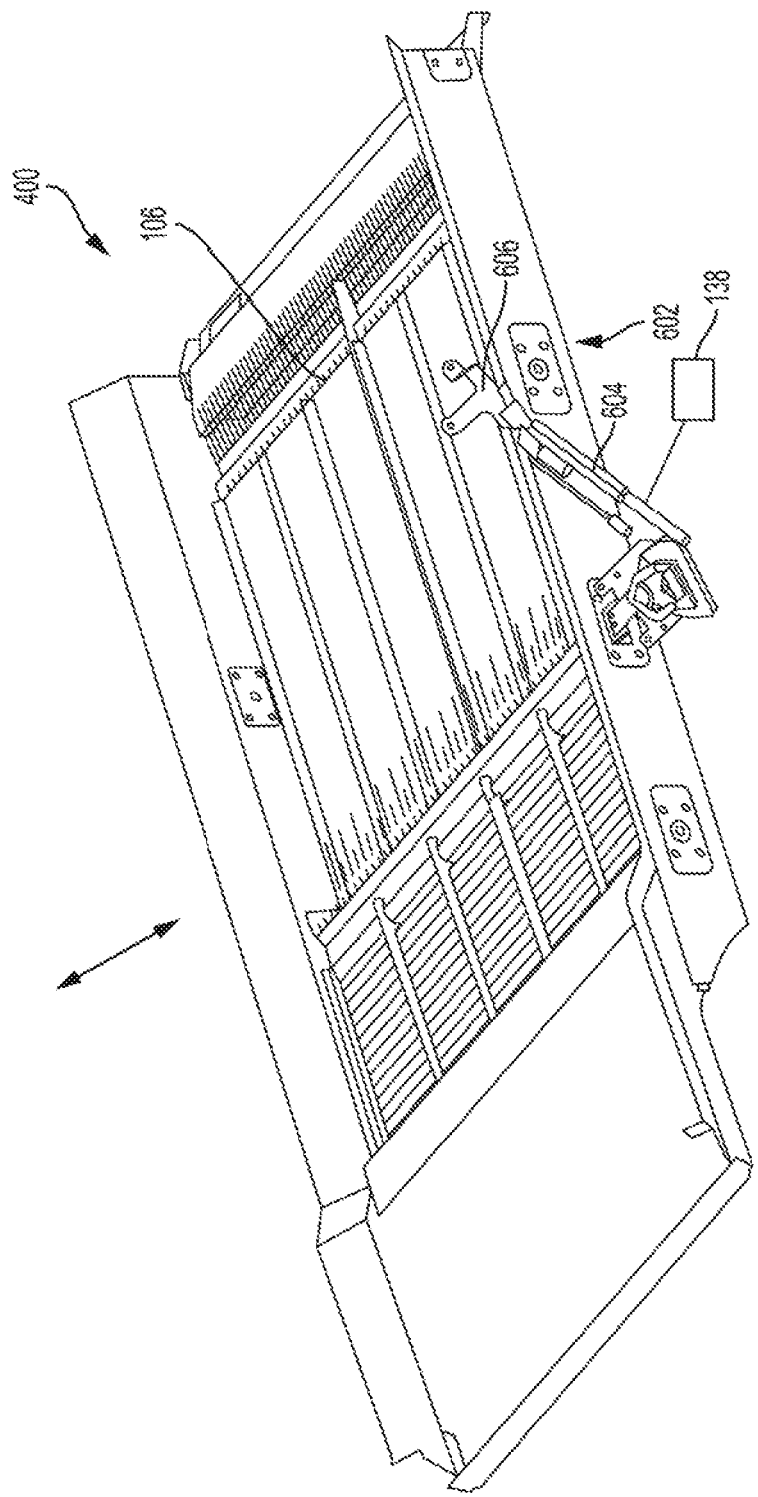
FIG. 6 is an isometric view of a partial cleaning system comprising the cleaning system of FIGS. 1 and 2 and a side shaking control system.

FIG. 6 is an isometric view of a partial cleaning system 600 comprising the cleaning system 100 (only the upper sieve 106 is shown) of FIGS. 1 and 2 in combination with a side shaking control system 602.

The side shaking control system 602 comprises an actuator 604 that is configured to move the sieves in a side-to-side motion (see arrows in FIG. 6) when the combine experiences a change in inclination (e.g., when operating on a hillside or uneven terrain). One end 606 of the actuator 604 is fixed to the combine chassis (such as wall 104) and the other end of the actuator 604 is fixed to the side wall of the upper sieve 106. The fasteners 112a, 112b, 120a, 120b, 126a and 126b of the cleaning system are positioned through bearings, and those bearings are configured to permit side to side motion of the cleaning system 600.

The actuator 604 is operated under the control of the controller 138 or a separate controller. In operation, a sensor (not shown) communicates the inclination of the combine to the controller 138, and the controller 138 adjusts the actuator 604 based upon the sensed inclination, which moves the sieve 106 to prevent the seeds from collecting on the lower elevation side of the sieve 106.

Although the actuator 604 shown in the exemplary embodiment described above is a linear actuator, an exemplary actuation device may, for example, include an electric actuator, a hydraulic actuator, a pneumatic actuator and a motor.

The side-to-side motion imparted by the side shaking control system 602 causes seeds and byproducts in the sieves to resist their natural tendency to migrate to the lower side of the sieves, and remain more evenly distributed across the width of the sieves. Side shaking control systems are known in the art, and are not described further herein. Further details of side shaking control systems are disclosed in U.S. Pat. No. 8,939,829, which is incorporated by reference in its entirety.

FIG. 7 depicts an alternative side shaking control system 702, which is shown schematically, for the partial cleaning system 600 of FIG. 6. According to this exemplary embodiment, like the control system 602 of FIG. 6, the shaking control system 702 is configured to move the sieves in a side-to-side motion (see arrows in FIG. 7) when the combine experiences a change in inclination.

The side shaking control system 702 comprises an arm 704 rigidly extending from the side wall of the upper sieve 106, a magnet 706 fixed to the free end of the arm 704, and a series of electromagnets 708 (five shown) that are arranged side-by-side and extend from a fixed point on the combine housing (such as the wall 104). The electromagnets 708 may be supported on a beam or post 710 that is fixedly mounted to the wall 104. The electromagnets 708 are controlled by a controller 712. The magnet 706 interacts with the electromagnets 708 in the same way that the magnet 133 interacts with the electromagnets 135 of the system 100, with the exception that interaction between the magnet 706 and the electromagnets 708 controls the side-to-side motion (see arrows in FIG. 7) of the upper sieve 106 and the lower sieve 108. Alternatively, the shaking control system 702 may only control the side-to-side motion of the upper sieve 106.

It should be understood that the configuration of the magnet 706 and the electromagnets 708 may vary from that which is shown and described. For example, the electromagnets 708 may be arranged along a curve as opposed to the straight line arrangement shown in FIG. 7. Also, the electromagnets 708 may be positioned at an elevation above the magnet 706.

In operation, the controller 712 selectively activates one (or more) of the electromagnets 708 to draw the magnet 706 toward the activated electromagnet 708. The sieve 106 (and, optionally, the sieve 108) moves along with the magnet 706 because the magnet 706 is fixedly mounted to the sieve 106. The magnet 706 is shown in a home position in FIG. 7. The magnet 706 may be moved from the home position to either the left or the right, depending upon the particular electromagnet 708 that is activated by the controller 712, thereby resulting in side-to-side motion of the sieve 106. It should be understood that the magnet 706 is capable of moving with respect to the electromagnets 708. It should also be understood that the system 702 replaces the system 602 of the partial cleaning system 600 of FIG. 6.

FIG. 8A depicts a top plan view of the magnetic propulsion system of FIG. 2 for the cleaning system 100, in which the magnetic propulsion system is shown schematically. In FIG. 8A it is seen that the magnet 133 follows the linear track of electromagnets 135 in the fore-aft and vertical directions (see arrows), as was described previously. FIG. 8A is provided for comparison purposes with FIG. 8B.

FIG. 8B depicts a top plan view of another magnetic propulsion system 802 for the cleaning system 100. The magnetic propulsion system 802 differs from the magnetic propulsion system of FIG. 8A in that the magnetic propulsion system 802 is also configured to move the sieve 106 from side to side. In other words, the magnetic propulsion system 802 is configured to translate the sieve 106 (and other components mounted to the sieve 106, such as the sieve 108) in the fore-aft-vertical direction and the transverse side to side direction.

In FIG. 8B it is seen that the magnet 133 can follow one of three electromagnets tracks 806, 808 and 810. Each track 806, 808 and 810 comprises a series of electromagnets 812 arranged side-by-side. Depending upon the inclination (or lack thereof) of the combine sensed by a sensor (not shown), the controller activates the electromagnets of one of the tracks 806, 808 and 810 to cause the magnet 133 to follow one of those tracks.

More particularly, the magnet 133 follows the linear track 806 when no inclination is sensed. When the magnet 133 follows the linear track 806 (as shown), the magnet 133 (and the sieve(s) connected thereto) moves in the fore-aft and vertical direction like that shown in FIG. 8A. The magnet 133 (and the sieve(s) connected thereto) does not move side to side when travelling along the track 806.

When the magnet 133 follows the linear track 808 (as shown), the magnet 133 (and the sieve(s) connected thereto) move in the fore-aft and vertical direction like that shown in FIG. 8A, as well as to the right. This causes the material on the sieve 106 to move to the left. The magnet 133 follows the linear track 808 when inclination in a first direction is sensed.

When the magnet 133 follows the linear track 810 (as shown), the magnet 133 (and the sieve(s) connected thereto) move in the fore-aft and vertical direction like that shown in FIG. 8A, as well as to the left. This causes the material on the sieve 106 to move to the right. The magnet 133 follows the linear track 808 when inclination in a second opposite direction is sensed.

The number and shape of the tracks 806, 808 and 810 may vary.

It should be understood that in a cleaning system 100 that comprises the magnetic propulsion system 802, the side shaking control systems 602 and 702 may be omitted.

Although the invention is illustrated and described herein with reference to specific embodiments, the invention is not intended to be limited to the details shown. Rather various modifications may be made in the details within the scope and range of equivalence of the claims and without departing from the invention.

What is claimed is:

1. A cleaning system for a combine harvester, said cleaning system comprising:
   a sieve for capturing grain; and
   a magnetic propulsion system configured to move the sieve in a reciprocating motion with respect to a stationary housing of the combine harvester, the magnetic propulsion system comprising:
      a magnetic material disposed to move along a path; and
      a plurality of electromagnets for attracting or repelling the magnetic material, the plurality of electromagnets disposed along the path of the magnetic material.

2. The cleaning system of claim 1, wherein the magnetic material is either a magnet or a ferromagnetic material.

3. The cleaning system of claim 1, wherein the magnetic material is fixedly mounted to the sieve, and the plurality of electromagnets is mounted to the stationary housing, such that either magnetic attraction or magnetic repulsion causes the sieve to move with respect to the stationary housing.

4. The cleaning system of claim 3, wherein the plurality of electromagnets is arranged side-by-side along the path of the magnetic.

5. The cleaning system of claim 3, wherein the plurality of electromagnets comprises two electromagnets, and the magnetic material is positioned between the two electromagnets.

6. The cleaning system of claim 4, wherein the plurality of electromagnets is further arranged along an arc.

7. The cleaning system of claim 1 further comprising a controller configured to control the magnetic propulsion system for moving the sieve in the reciprocating motion with respect to the stationary housing of the combine harvester.

8. The cleaning system of claim 1 further comprising a second sieve that is connected to said sieve by one or more links, wherein the one or more links are configured to transfer motion of said sieve to said second sieve.

9. The cleaning system of claim 1 further comprising a second sieve and a second magnetic propulsion system configured to move the second sieve in a reciprocating motion with respect to the stationary housing of the combine harvester.

10. The cleaning system of claim 1, wherein the magnetic propulsion system is configured to move the sieve in fore-to-aft and vertical directions, and the cleaning system further comprises a side-shaking control system for moving the sieve in a side-to-side direction that is orthogonal to the fore to aft fore-to-aft and vertical directions.

11. The cleaning system of claim 10, wherein the side-shaking control system comprises a linear actuator that is connected between the sieve and the stationary housing.

12. The cleaning system of claim 10, wherein the side-shaking control system comprises the magnetic propulsion system.

13. The cleaning system of claim 10, wherein the side-shaking control system comprises a second magnetic propulsion system, and the second magnetic propulsion system comprises (i) a magnetic material, and (ii) at least one electromagnet that is capable of either attracting or repelling the magnetic material.

14. A cleaning system for a combine harvester, said cleaning system comprising:
   a sieve for capturing grain;
   a magnetic propulsion system configured to move the sieve in a reciprocating motion in fore-to-aft and vertical directions with respect to a stationary housing of the combine harvester, the magnetic propulsion system comprising:
      a magnetic material disposed to move along a path; and
      a plurality of electromagnets for attracting or repelling the magnetic material, the plurality of electromagnets disposed along the path of the magnetic material; and
   a side-shaking control system for moving the sieve in a side-to-side direction that is orthogonal to the fore-to-aft and vertical directions.

15. The cleaning system of claim 14, wherein the side-shaking control system comprises a linear actuator that is connected between the sieve and the stationary housing.

16. The cleaning system of claim 14, wherein the side-shaking control system comprises the magnetic propulsion system.

17. The cleaning system of claim 14, wherein the side-shaking control system comprises a second magnetic propulsion system, and the second magnetic propulsion system comprises (i) a magnetic material, and (ii) at least one electromagnet that is capable of either attracting or repelling the magnetic material.

18. The cleaning system of claim 14, wherein the plurality of electromagnets is arranged side-by-side along the path of the magnetic material.

19. The cleaning system of claim 18, wherein the plurality of electromagnets is further arranged along an arc.

20. A cleaning system for a combine harvester, said cleaning system comprising:
   a sieve for capturing grain; and
   a magnetic propulsion system configured to move the sieve in a reciprocating motion in fore-to-aft and vertical directions with respect to a stationary housing of the combine harvester, the magnetic propulsion system comprising:
      a magnetic material fixedly mounted to one of the sieve and the stationary housing; and
      a plurality of electromagnets affixed to the other of the sieve and the stationary housing, the plurality of electromagnets for attracting or repelling the magnetic material to cause the sieve to move with respect to the stationary housing, the plurality of electromagnets disposed along a path along which the magnetic material or the plurality of electromagnets moves.

21. The cleaning system of claim 20 further comprising a side-shaking control system for moving the sieve in a side-to-side direction that is orthogonal to the fore-to-aft and vertical directions.

22. The cleaning system of claim 20, wherein the plurality of electromagnets is arranged side-by-side along the path.

23. The cleaning system of claim 22, wherein the plurality of electromagnets is further arranged along an arc.

* * * * *